US011993934B2

(12) United States Patent
Nielsen

(10) Patent No.: US 11,993,934 B2
(45) Date of Patent: May 28, 2024

(54) ROOF WINDOW SYSTEM WITH A VENTILATION UNIT MOUNTED ADJACENT TO THE ROOF WINDOW, A ROOF STRUCTURE INCLUDING A ROOF WINDOW SYSTEM, A METHOD OF PROVIDING A ROOF WINDOW SYSTEM AND A METHOD OF RETROFITTING A ROOF WINDOW SYSTEM

(71) Applicant: VKR Holding A/S, Hørsholm (DK)

(72) Inventor: Kristian Ørnsvig Nielsen, Hornsyld (DK)

(73) Assignee: VKR Holding A/S (DK)

( * ) Notice: Subject to any disclaimer, the term of this patent is extended or adjusted under 35 U.S.C. 154(b) by 0 days.

(21) Appl. No.: 18/195,328

(22) Filed: May 9, 2023

(65) Prior Publication Data

US 2023/0279664 A1 Sep. 7, 2023

Related U.S. Application Data

(62) Division of application No. 17/134,013, filed on Dec. 24, 2020, now Pat. No. 11,686,096.

(30) Foreign Application Priority Data

Dec. 30, 2019 (DK) ........................... PA 2019 70837

(51) Int. Cl.

*E04D 13/03* (2006.01)
*E06B 7/10* (2006.01)
*F24F 7/02* (2006.01)

(52) U.S. Cl.

CPC ....... *E04D 13/0325* (2013.01); *E04D 13/031* (2013.01); *F24F 7/025* (2013.01); *E06B 7/10* (2013.01); *F24F 2221/20* (2013.01)

(58) Field of Classification Search

CPC .... F24F 13/18; F24F 7/02; F24F 7/025; F24F 2221/20; E06B 7/02; E06B 7/10;

(Continued)

(56) References Cited

U.S. PATENT DOCUMENTS

| | | | |
|---|---|---|---|
| 217,630 | A | 7/1879 | Maull |
| 614,497 | A | 11/1898 | Praetsch |

(Continued)

FOREIGN PATENT DOCUMENTS

| | | |
|---|---|---|
| CN | 207673232 | 7/2018 |
| DE | 102004052936 | 5/2006 |

(Continued)

OTHER PUBLICATIONS

Danish Search Report and Opinion dated Jul. 2, 2020 issued in Danish Application No. PA 2019 70837, eight (8) pages.

(Continued)

*Primary Examiner* — Kyle J. Walraed-Sullivan
(74) *Attorney, Agent, or Firm* — Merek, Blackmon & Voorhees, LLC

(57) ABSTRACT

In a roof window system, the housing (6) of the ventilation unit (5) is prepared for accommodation of a standard ventilator and/or a regenerator allowing an air current through a ventilation passage (28), from an exterior grating (18) to a ventilation panel (3) integrated into or in continuation of a lining panel of a room in the interior of the building in which the roof window is installed.

5 Claims, 5 Drawing Sheets

(58) Field of Classification Search
CPC . E06B 2007/023; E04D 13/03; E04D 13/031; E04D 13/0325
See application file for complete search history.

(56) References Cited

U.S. PATENT DOCUMENTS

| | | | | |
|---|---|---|---|---|
| 1,126,875 | A | 2/1915 | Saunders | |
| 1,446,066 | A | 2/1923 | Pratt | |
| 1,643,554 | A | 9/1927 | Glass | |
| 4,338,996 | A * | 7/1982 | Frank | E06B 9/17<br>165/122 |
| 4,736,677 | A | 4/1988 | Smith | |
| 4,986,039 | A | 1/1991 | Weisner | |
| 5,046,407 | A | 9/1991 | Nielsen | |
| 5,062,247 | A | 11/1991 | Dittmer | |
| 5,581,945 | A | 12/1996 | Baumle | |
| 6,558,247 | B1 * | 5/2003 | Peak | F24F 13/28<br>454/213 |
| 6,648,750 | B1 | 11/2003 | Wiseman | |
| 6,695,692 | B1 | 2/2004 | York | |
| 7,083,110 | B2 | 8/2006 | Kim | |
| 9,182,137 | B1 * | 11/2015 | Gardella | F24F 8/108 |
| 10,808,956 | B2 | 10/2020 | Soyyigit | |
| 10,830,464 | B1 | 11/2020 | Stevenson | |
| 10,907,403 | B2 | 2/2021 | Pemberton | |
| 11,248,415 | B1 * | 2/2022 | Crittenden | F24F 13/18 |
| 2002/0095884 | A1 | 7/2002 | Lindgren | |
| 2004/0139669 | A1 | 7/2004 | Feucht | |
| 2005/0003755 | A1 * | 1/2005 | Koessler | F24F 13/08<br>454/359 |
| 2010/0323603 | A1 * | 12/2010 | Lans | F24F 13/06<br>55/496 |
| 2012/0137607 | A1 | 6/2012 | Kristensen | |
| 2014/0230349 | A1 | 8/2014 | Rasmussen | |
| 2015/0300677 | A1 * | 10/2015 | Wang | E06B 7/02<br>55/385.2 |
| 2018/0179760 | A1 | 6/2018 | Humble | |
| 2019/0249889 | A1 | 8/2019 | Chan | |
| 2021/0198894 | A1 | 7/2021 | Jacobsen | |
| 2022/0145688 | A1 | 5/2022 | Duncan | |
| 2022/0282875 | A1 * | 9/2022 | Lin | F24F 13/06 |

FOREIGN PATENT DOCUMENTS

| | | |
|---|---|---|
| DE | 202016100906 | 8/2016 |
| EP | 2317026 | 11/2009 |
| EP | 2784240 | 1/2014 |
| EP | 2762653 | 8/2014 |
| EP | 2762670 | 8/2014 |
| EP | 2813632 | 12/2014 |
| EP | 3309468 | 4/2018 |
| EP | 3348736 | 7/2018 |
| EP | 3404191 | 11/2018 |
| GB | 2259540 | 3/1993 |
| GB | 23003441 | 2/1997 |
| GB | 2194038 | 2/1998 |
| GB | 2412164 | 9/2005 |
| JP | S63279039 | 11/1988 |
| JP | H0762810 | 3/1995 |
| JP | 2014020146 | 2/2014 |
| KR | 20180050905 | 5/2018 |
| WO | WO2019015732 | 1/2019 |

OTHER PUBLICATIONS

European Search Report dated May 17, 2021 issued in European Application No. EP 20216784, five (5) pages.
Machine generated translation of DE202016100906.
U.S. Appl. No. 17/134,033.
Machine translation of CN207673232.
Machine translation of JPS63279039.
Machine translation of KR20180050905.
Chinese Office Action dated Mar. 13, 2024 issued in connection with Chinese Application No. 202011600246.4.
Translation of Chinese Office Action dated Mar. 13, 2024 issued in connection with Chinese Application No. 202011600246.4.
Chinese Office Action dated Dec. 1, 2023 issued in connection with Chinese Application No. 202011600246.4.
Translation of Chinese Office Action dated Dec. 1, 2023 issued in connection with Chinese Application No. 202011600246.4.

* cited by examiner

ROOF WINDOW SYSTEM WITH A VENTILATION UNIT MOUNTED ADJACENT TO THE ROOF WINDOW, A ROOF STRUCTURE INCLUDING A ROOF WINDOW SYSTEM, A METHOD OF PROVIDING A ROOF WINDOW SYSTEM AND A METHOD OF RETROFITTING A ROOF WINDOW SYSTEM

A roof window system with a ventilation unit mounted adjacent to the roof window, a roof structure including a roof window system, a method of providing a roof window system and a method of retrofitting a roof window system.

TECHNICAL FIELD

The present invention relates to a roof window system configured for being mounted in an opening in a roof structure of a building, the roof window system including a ventilation unit configured for being mounted adjacent to a roof window and adapted for providing ventilation of the interior of the building in which the roof window is mounted, the roof window comprises at least one frame defining a frame plane and including a pane mounted in the frame, the frame comprising a top frame member intended for being located highest in the mounted state when seen in the direction of inclination of the roof structure, a bottom frame member opposite the top frame member, and two side frame members extending between the top frame member and the bottom frame member, said frame members together form a window structure delimiting a frame opening and each having an interior side intended for facing the interior in the mounted state, an exterior side intended for facing the exterior, an inner side facing the frame opening and an outer side facing away from the frame opening, where the ventilation unit is configured for being arranged primarily adjacent to or near the outer side of a frame member.

BACKGROUND ART

Roof windows can serve different purposes on buildings. Besides facilitating the entry of natural light indoors, they may keep the building ventilated. The provision of ventilation in windows has become standard equipment nowadays. Ventilation itself can be divided into mechanical, or forced, and natural ventilation. In mechanical ventilation, fresh air is supplied into the room with the help of fans, ducts, inlet and outlet openings or vents. In natural ventilation, the air flow is brought through purpose provided openings, e.g. windows, like airing. There are lower investment, maintenance and operational costs associated with natural ventilation. On the other side, natural ventilation systems may not be able to keep a constant air flow rate, since they are much dependent on outdoor weather conditions (i.e. wind speed, wind direction, temperature differences). Overall, windows may offer different options of ventilating a room and refreshing the air indoors. This can help to improve indoor air quality and also, reach a desired indoor temperature. Moreover, ventilating through windows can be a quick, affordable and noise-less solution for the occupants. Different solutions for enhancing the ventilation through windows have been previously developed and found in literature.

Background ventilators have been known and extensively used as an efficient way of providing ventilation through external walls into habitable rooms. Background ventilators (or wall ventilators) provide a secure ventilation opening generally located in a wall or window for the purpose of provision of general ventilation, generally incorporating a controllable ventilation grill which can be fully closed. Background ventilators allow fresh air to replace stale air indoors, help to reduce the amount of moisture within the air and also circulate the air within a room. These features make them a well-established ventilating solution in buildings. Background or wall ventilators do however take room from the exterior structure of a building and require specific modifications to the building envelope. Furthermore, they often result in bulky and not discreet or non-aesthetic solutions.

A combination of background ventilators and windows has been previously introduced and can be found in literature. An example of combined roof window and ventilator structure may be found in GB 2 259 540 A, which is intended for conservatories, providing a ventilator structure, and comprises a roof panel, an aperture and a covering panel. A combination of a glazed panel with a roof panel is also disclosed. In GB 2 412 164 A, a system for providing ventilation to/from a building is proposed which comprises a ventilation casing and at least one removable ventilation device. The ventilation device may be housed in a removable tray. The system may be installed above a window or door frame or fitted into an aperture in a wall.

The above-mentioned prior art documents provide good solutions of ventilating the indoor space by combining ventilators and roof windows. However, their configuration is usually complicated and certain alterations to the existing window and/or roof structure may be needed. Moreover, the intervention on the exterior of the building is significant, also leading to necessary modifications of the roof structure (e.g. removal of tiles around the roof window). Different modifications are needed in the roof window or window frame to comply with the ventilator structures. This makes the above-presented solutions hard to manufacture and implement, as well as difficult to implement in a wide range of roof windows.

In general, interface means for roof windows have been known in prior art. Interface means integrated into roof windows may serve different purposes apart from ventilation, such as providing sound insulation or accommodating different accessories. EP 3 404 191 A2 discloses a roof window comprising interface means for positioning along a circumference of the window. The interface means comprise climate regulating elements that provide sound insulation and/or thermal insulation and/or moisture insulation, and the interface means are immediately interchangeable with other interface means. The interface means are integrated into the window frame and consist a part of the roof window.

The interface means or housings provided with roof windows that are often found in prior art require specific alterations to the existing window frames. Some of them are integrated inside the window frame, thus being not easily accessible and less versatile. Furthermore, condensation problems are often observed in ventilators, which may commonly affect the workability. All these reasons infer several limitations to the existing solutions of interface means for roof windows.

SUMMARY OF INVENTION

With this background, it is an object of the invention to provide a roof window system by which it is possible to customize the window without compromising other parameters such as functionality, installation, use, or aesthetics.

This and further objects are achieved with a roof window system of the kind mentioned in the introduction which is furthermore characterised in that it comprises a housing prepared to accommodate a ventilator. The housing constitutes a separate module mounted adjacent to the roof window, the top side is positioned substantially in the plane of the frame plane, such that it does not protrude towards the exterior of the building, and the housing comprises a longitudinal channel, said longitudinal channel is mounted onto the window frame, in parallel to the longitudinal edge of the top frame member, and the housing comprises a drainage channel extending from the longitudinal channel to the ventilator, such that it forms a positive angle with a bottom side of the longitudinal channel, defined in an opposite direction of the top side.

In a second aspect, a roof structure is provided with such a roof window system.

In a third aspect, a method of providing a roof window system is provided.

In a fourth aspect, a method of retrofitting a roof window system is provided.

One non-limiting advantage that is gained by the use of the roof window system according to the invention is providing a ventilation unit that integrates well with a roof and roof window and utilizes the available space, while the installation is simple. This is achieved by the ventilation unit being placed adjacent to or near the outer side of the frame member, meaning that only a minimal amount of roofing material has to be removed and that the total roof window system will appear compact in the mounted state. Therefore, a flexible solution is provided that may be mounted to most roof windows, without causing any extra damage to the roof, since the existing window structure (i.e. frame members) are used to support the ventilation unit and the ventilation panel. Furthermore, the ventilation unit is easily accessible, even after installation of the window in a surrounding building structure, as well as easy to interchange. From the manufacturer's point of view, this allows for a versatile product range by a lean range of product parts. The housing which is a separate module allows for an interchangeable element, enabling the user to open, replace and maintain components of the ventilation unit. In addition, the presence of the drainage channel drains any cold or hot water that is condensed inside the ventilation unit out to the roof structure and does not permit it to enter towards the building construction.

In an embodiment, the ventilation unit may comprise a lining panel and the housing may be configured to receive a ventilator and/or a regenerator allowing an air current through a ventilation passage created by a ventilation panel. The ventilation panel extending from one side of the ventilator to the lining panel may connect the space defined by the housing with the space at the internal side of the window defined by the interior of the building.

The ventilation panel allowing air to flow from one side of it to the other facilitates the natural ventilation and may ultimately contribute to the improvement of the indoor air quality and thermal comfort. The flexibility and ease of the window installation is ensured and the operation of the ventilation is facilitated through the ventilation panel which is facing the interior of the building and extending away from the interior side of the frame member. This means that the ventilation panel is located in continuation of the inner side of the window frame member so that the air enters close to the window and the wall or ceiling of the building is not interrupted or at least only interrupted where an opening has already been made for the window. Air entering close to the window may contribute to a better thermal sensation of the occupants of the building. Furthermore, the window frame itself does not have to be modified.

In an embodiment, the ventilation panel is placed 5 mm away from the inner frame plane towards the outer direction. The ventilation panel may be placed in a distance of 6, 7, 8, 9, 10 mm from the inner frame plane towards the outer direction. The positioning of the ventilation panel such that it does not extend below the inner frame plane facilitates the invisibility of the ventilation panel from indoors.

The inner frame plane and the outer frame plane define the thickness of the frame member. The ventilation panel may be configured such that the thickness of it does not exceed ⅓ of the total thickness of the frame member.

In one embodiment of the invention, the ventilation panel may be configured such that the intended air flow direction may extend substantially perpendicular to the frame plane in the mounted state. This allows for an effective exchange of air between an interior space covered by the roof structure and an exterior surrounding the building, the air flow direction being substantially parallel to the frame plane and hence to the pane of the window. This may contribute to reducing the formation of condensation on or at the pane.

The ventilation panel may further comprise a ventilation duct for covering and protecting the ventilation panel and directing the air towards the ventilation passage and to the interior of the building. The ventilation duct may comprise a permeable fabric (e.g. polyester).

The ventilation unit may be configured to be connected to or adjacent to a frame member. This may allow the ventilation unit to be mounted to any roof window, without causing severe damage to the roof, thus consisting a flexible solution. Moreover, the window and the ventilation unit may potentially be handled as one unit during installation.

The ventilation unit may be mounted by connecting means to the window frame or by connecting bracket means to the roof structure.

The ventilation unit may be configured to be arranged at the top frame member, which is an optimal position from a ventilation point of view, but could also be at the bottom or at the sides of the window. In addition, other types of accessories such as shades, shutter, blind, rain sensors etc. are typically mounted at the top of roof windows and by positioning the ventilation unit here means that one housing can be used for one or more different accessories.

The ventilation unit may preferably comprise a cover side configured for being arranged adjacent to or at the interior side of said frame member.

The ventilation unit may further comprise a hinge at the exterior outer side of the housing, such that the opening and/or closing of the top case of the housing is enabled.

The ventilation panel may be configured for being accommodated in a groove in the frame adapted for receiving a lining panel and/or provide a groove configured to accommodate a lining panel. This makes the ventilation panel easy to install and provides a robust and visually appealing joint between the ventilation panel and the frame and/or lining panel. The ventilation panel may extend between the interior side of the roof window frame and the lining panel covering at least a part of a surface of the roof structure defining the roof opening in the mounted state, thus replacing and/or being integrated into the innermost part of a prior art lining panel closest to the window frame.

The roof window system may further comprise a lining panel, according to which the ventilation panel is integrated in the lining panel. The ventilation panel may be mounted into the top part of the lining panel. In this case, this will make the ventilation panel not visible from an average eye-level height indoors and eliminating a step in the mounting process since the ventilation panel will automatically come into place when mounting the lining panel.

The ventilation panel may comprise a grating and/or a closure, for safety reasons.

The housing may comprise a top case which is located adjacent to or near the window frame and covers the top side of the housing. The top case may comprise an air inlet allowing an air passage into the housing, such that the air inlet is located substantially in the plane defined by the exterior side of the frame side member. This configuration does not allow rainwater from the roof structure to enter into the ventilation unit. Thus, it contributes to the water proofing of the ventilation unit and the smooth operation of it.

The roof window system may further comprise a sash, comprising a top member, bottom member and two side members defining a sash plane. The ventilation unit may be configured for being mounted such that the ventilating unit, the frame member adjacent to which the ventilation unit is mounted and the corresponding sash member are located substantially in continuation of each other when seen in the direction of the frame plane in the mounted state. The housing being generally in the plane of the frame makes it possible to provide a ventilation assembly which is inconspicuous and easy to install, as the same aperture in the roof may be utilized, for instance simply by removing one or more rows of tile above the window. No penetration of the underlying vapour barrier collar is necessary, just as the provision of cover members is made easy. Consequently, flashing members fitting the roof window may be provided, just with an extra length as compared to the flashing fitting the window itself to accommodate the housing of the ventilation unit, as well.

The dimensions of the housing may be chosen such that the length of the housing is parallel to the length of the frame member which the ventilation unit is adjacent to, and does not exceed the length of the frame member, and the height of the housing is parallel to the height of the frame member which the ventilation unit is adjacent to, and does not exceed the height of the frame member. This provides ease of installation since the aperture in the roof may be utilized without making extreme alterations to the roof structure and means that the ventilation assembly does not stand out from the roof window thus making the roof window system inconspicuous in the mounted state. In order to make the underroof water tight, the roof membrane may need to be penetrated and the commonly used underfelt collar may be extended to also cover the housing. This may require that the underfelt collar has a necessary size to cover the whole roof window system.

It may be advantageous to choose the dimensions of the housing, such that the length of the housing is parallel to the length of the frame member which the ventilation unit is adjacent to, and is smaller than the length of the frame member, and the height of the housing is parallel to the height of the frame member which the ventilation unit is adjacent to, and is smaller than the height of the frame member. This may reduce the manufacturing costs and result in less bulky housing that is easier to mount.

In relation to the frame member which the ventilation unit is adjacent to, a length dimension may be defined as a dimension substantially in parallel with a respective top or bottom peripheral side of the pane in the mounted state, a height dimension may be defined as a direction perpendicular to the length dimension, and a width dimension may be defined as a dimension perpendicular to the height and length dimensions.

The roof window system may be mounted in an inclined roof structure. Inclined roof windows are typically built into an opening in an inclined roof structure with an angle above 15 degrees with a substantial part of the inclined roof window being positioned within the inclined roof structure in an installed position. Thus, roof windows for inclined roofs are typically built into the roof structure. This means that the frame and sash, e.g. most of the frame and sash structures, are embedded in the roof so that much, most or all of an outer surface of the frame facing away from the opening in the frame is positioned within the roof structure.

The ventilation unit may be configured for installation in a sloping roof with inclination from 20 to 70 degrees, preferably 35 to 60 degrees. The drainage channel may be configured to form an angle of at least 5 degrees with reference to the plane of the window.

The ventilation unit may comprise an input and exhaust of air and/or a ventilator and/or a regenerator and/or an air purifying filter. The ventilator may be pivotally journaled in housing of the ventilation unit to switch the flow direction. A regenerator or a heat exchange device may also be comprised in the ventilation assembly. Other elements that may be comprised into the housing may be found in the application EP 2 784 240 A2.

The roof structure may include the roof window system, including the ventilation unit.

The method according to the invention comprises the steps of:

arranging the ventilation unit adjacent to the outer side of a frame member, said ventilation unit being adapted for providing ventilation of the interior of the building, arranging a ventilation panel so that it faces the interior of the building and extends away from the interior side of the frame member adjacent to which the ventilation unit is mounted, and passing air through a ventilation panel from one side of the ventilation panel to another side of the ventilation panel in an intended air flow direction using the ventilation unit. This method may comprise the steps of providing the housing with activation means, connecting the ventilation unit or units to the housing and activating the housing by operating the ventilation unit. Activation means may be a closure that is handled manually, a ventilation flap etc. The closure may be temporary locked between an open and a closed position. According to this, the operation of the ventilation unit is facilitated.

The method of retrofitting the roof window system may comprise the steps of:

removing the housing, selecting an element of the ventilation unit, installing and/or replacing the element of the ventilation unit, mounting the housing back to the ventilation unit.

According to this, the retrofitting of the ventilation unit is facilitated, as well as its reusability and adjustability to create custom-made solutions according to the user's needs.

The method of installing the roof window system may further comprise the steps of:

adapting the insulation of the interior of the building, adapting the lining panel, installing the ventilation panel, installing a closure for the ventilation panel.

The adaptation of the insulation allows for the installation of the roof window system including the ventilation panel in newly-built and/or older buildings. The ventilation panel may be placed near the window pane and/or near the bottom side of the lining panel.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

Embodiments and advantages described with reference to one aspect of the invention also applies to the other aspect(s) unless otherwise stated.

BRIEF DESCRIPTION OF DRAWINGS

The invention will be described in more detail below by means of non-limiting examples of embodiments and with reference to the schematic drawings, in which.

DESCRIPTION OF EMBODIMENTS

Referring to FIGS. 1 to 5 showing the overall appearance and principles underlying a roof window system in embodiments of the invention, the roof window system comprises a roof window 13 and a ventilation unit 5. In the embodiments shown, a ventilation panel 3 is furthermore provided at an arbitrary position to provide ventilation to the interior of the room of the building in which the roof window system is installed.

Figure 1A:
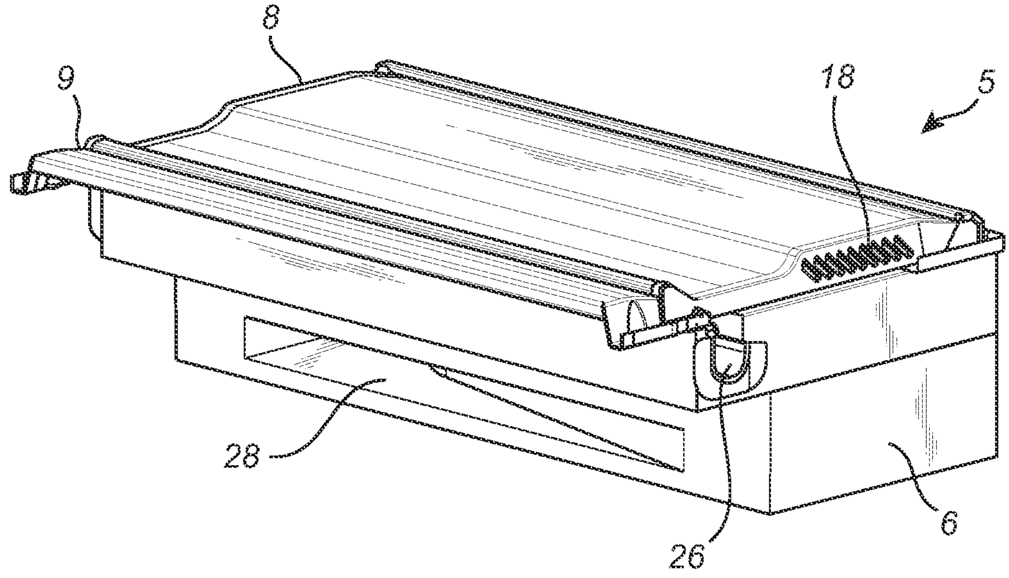
FIG. 1*a* is a perspective view of a housing of the ventilation unit in an embodiment.
Figure 1B:
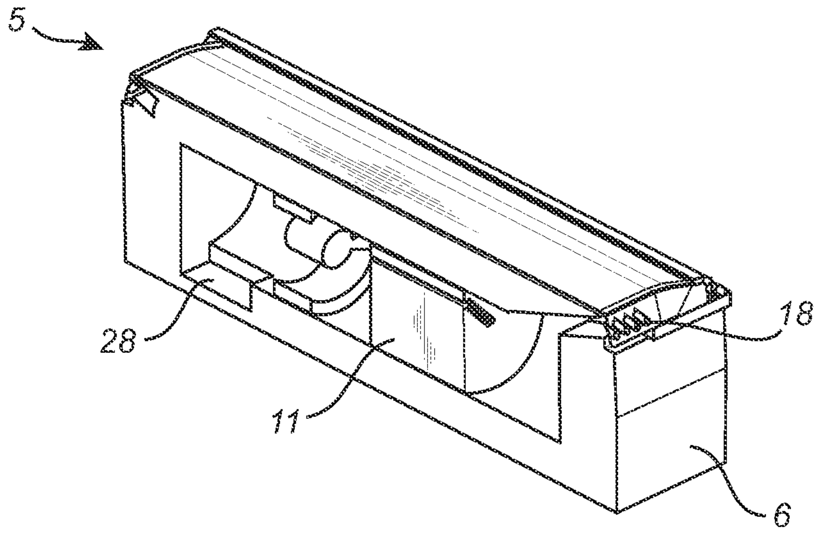
FIG. 1*b* is a perspective sectional view of the ventilation unit of FIG. 1*a,*
Figure 2:
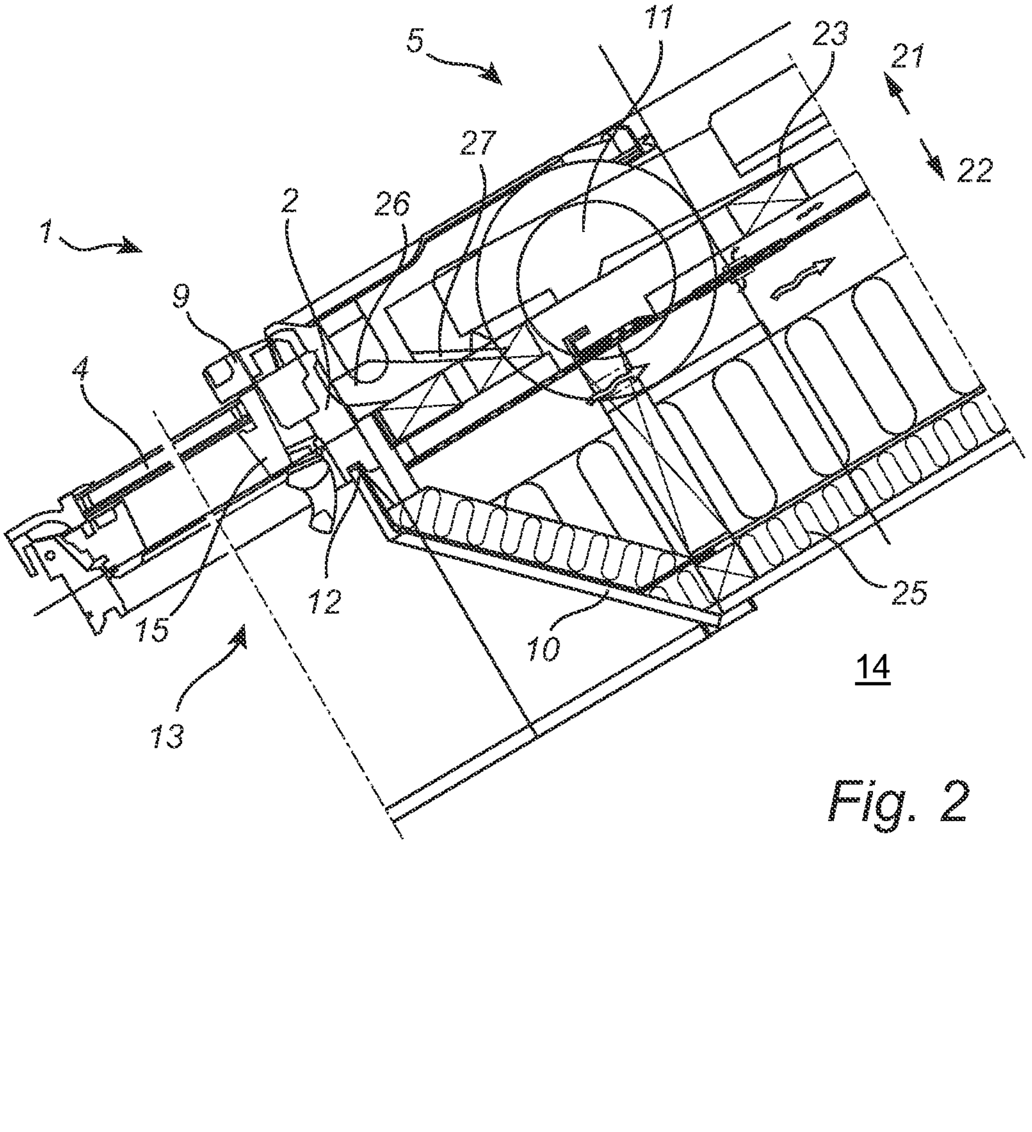
FIG. 2 is a cross-sectional view of another embodiment of a mounted roof window system in an inclined roof structure, with a ventilation unit.

Referring initially to FIGS. 1*a* to 1*b* and FIG. 2, the ventilation unit 5 of the roof window system 1 is mounted adjacent to a frame 2 of the roof window 13, which also includes a sash 15 and a pane 4. The frame 2 is adapted to be built into a roof structure 23 of virtually any kind, typically comprising a number of rafters, battens, and further non-shown details such as vapour barrier collars etc., below a roofing material. The ventilation unit 5 is arranged adjacent to the outer side of the frame member adjacent to which the ventilation unit is placed adjacent to, i.e. in this case the top frame member.

The frame (and/or the sash) of the window may be made of wooden members or members made of cast or extruded polyurethane (PUR). In the mounted state, the frame 2 and the sash 15 are protected by cover elements, of which the top frame covering 9 is shown. Towards the interior, a lining panel 10 is provided as a suitable finishing A groove 12 is provided in the frame member for receiving the lining panel.

In FIG. 2 the roof window is mounted on an inclined roof structure, while the ventilation panel is not shown. A longitudinal channel 26 is mounted onto the window frame 2, in parallel to the longitudinal edge of the top frame member. The housing 6 comprises a drainage channel 27 extending from the longitudinal channel to the ventilator 11, forming a positive angle with a bottom side of the longitudinal channel, such that rainwater is drained out to the roof.

In relation to the roof window system, an exterior direction 21 is defined as facing towards the surrounding of the building, an interior direction 22 is the opposite direction of the exterior facing towards the interior 14 of the building. An inner direction is defined as facing towards the window pane 4, while an outer direction is the opposite of the inner one.

The ventilation unit 5 comprises a housing 6. The ventilation unit 5 may be adapted to be connected to the roof window 13 so as to provide an air connection between the interior of the building 14 and the exterior in the mounted state. The housing 6 accommodates the ventilation unit 5 and is placed adjacent to the top frame member. In this embodiment, the ventilation unit 5 further comprises a ventilator 11 and an exterior air grating 18 as seen in FIGS. 1*a* and 1*b*. In the ventilation unit 5, an air purification filter may be also comprised. The housing 6 is generally designed as having a top case or cover 8, a bottom part and/or (an) end piece(s). in FIG. 1*a*, the relationship between the roof window as represented by its top frame covering 9, the longitudinal channel 26 and the top case 8 of the ventilation unit 5 is shown.

A ventilation passage 28 forms the transitional area from the ventilation unit 5 to the roof window 13 to provide the air connection aimed at. Turning now also to FIGS. 3*a* to 3*b* and 4*a* to 4*c*, the ventilation passage 28 is configured to provide connection to the ventilation panel 3 (not shown in FIG. 2) to allow air to pass from one side of the ventilation panel to the other, defining an intended air flow direction 20. The intended flow direction 20 may be provided in accordance with the specific needs of the room of the building, or in accordance with existing structural solutions, such that the ventilation panel 3 may extend substantially perpendicular to the frame plane, in parallel with the frame plane, or at an angle to the frame plane in the mounted state of the roof window 13. In any event, the ventilation panel 3 is positioned facing the interior 14 of the building, and extends away from the interior side of the frame member.

Figure 3A:
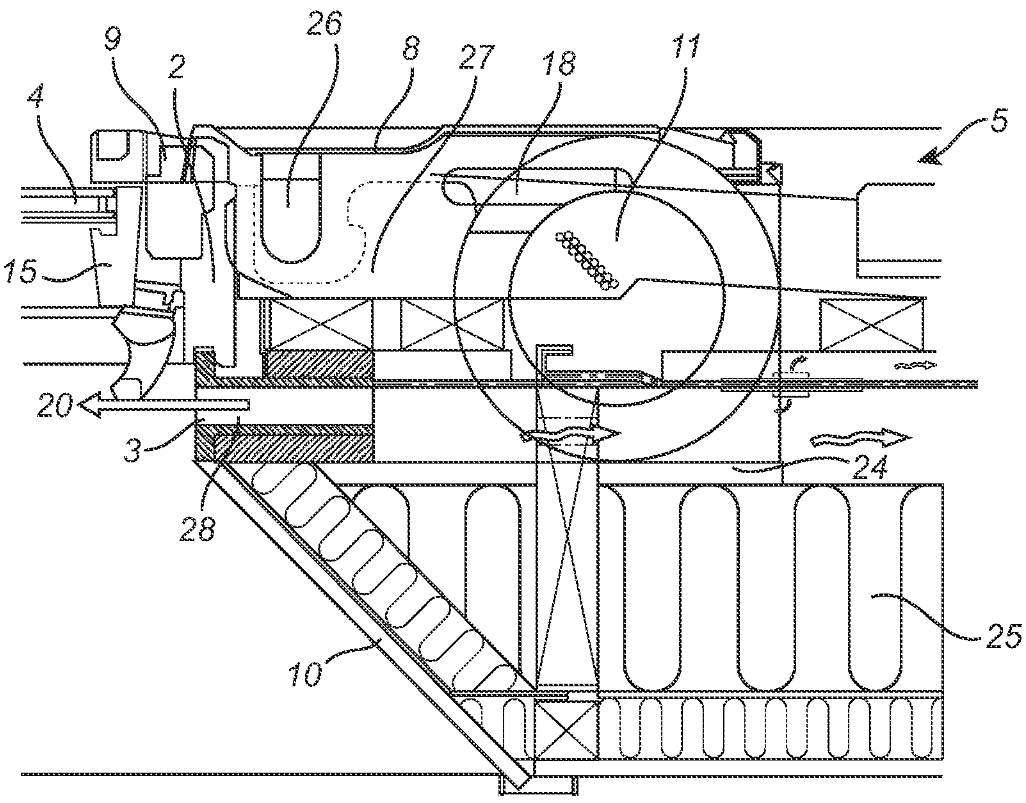
FIG. 3*a* is a sectional view of a further embodiment of the ventilation unit mounted on a roof window system.
Figure 3B:
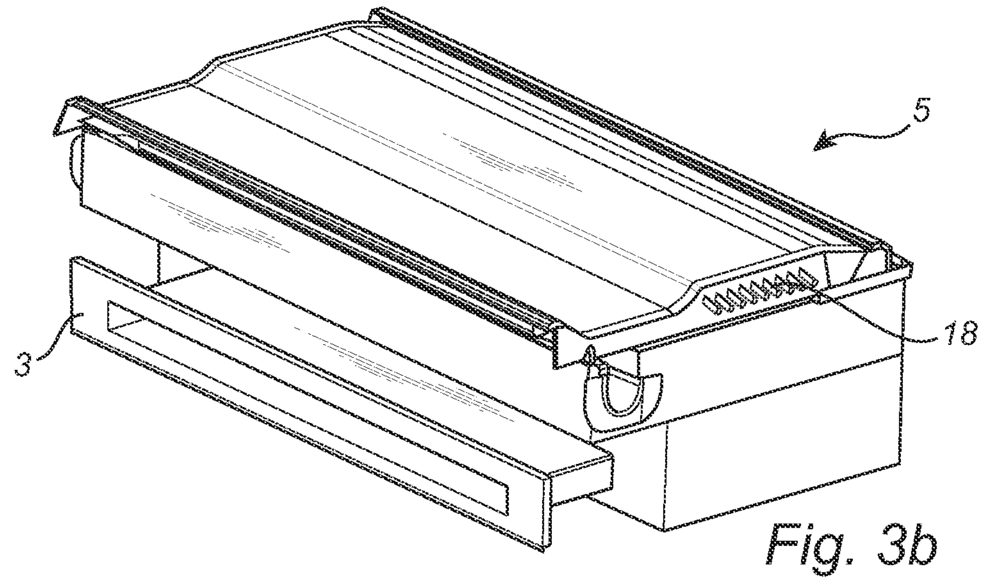
FIG. 3*b* is a schematic perspective view of a ventilation unit of a roof window system in the further embodiment according to the invention.

FIG. 3*a* shows a cross-sectional view of an embodiment of the roof window system. FIG. 3*b* is included to provide a better overview of the components, in particular the ventilation panel 3 and the exterior grating 18. The longitudinal channel 26 is mounted onto the window frame 2, in parallel to the longitudinal edge of the top frame member. The housing 6 comprises a drainage channel 27 extending from the longitudinal channel to the ventilator 11, forming a positive angle with a bottom side of the longitudinal channel, such that rainwater is drained out to the roof. In FIG. 3*a*, it is shown how the ventilation panel 3 is integrated into the lining panel 10 near the window pane 4. The ventilation panel 3 could also be in continuation with the lining panel 10. The lower side of the ventilation unit 24 is positioned closest to the lining panel 10. The insulation 25 is adjusted at the top end so that the ventilation panel is placed near the window pane 4. When the roof window system is mounted, the exterior air grating 18 is placed such that it is higher than the plane of the roof window, so that rainwater does not enter into the exterior air grating 18 and into the ventilation unit 5.

Figure 4A:
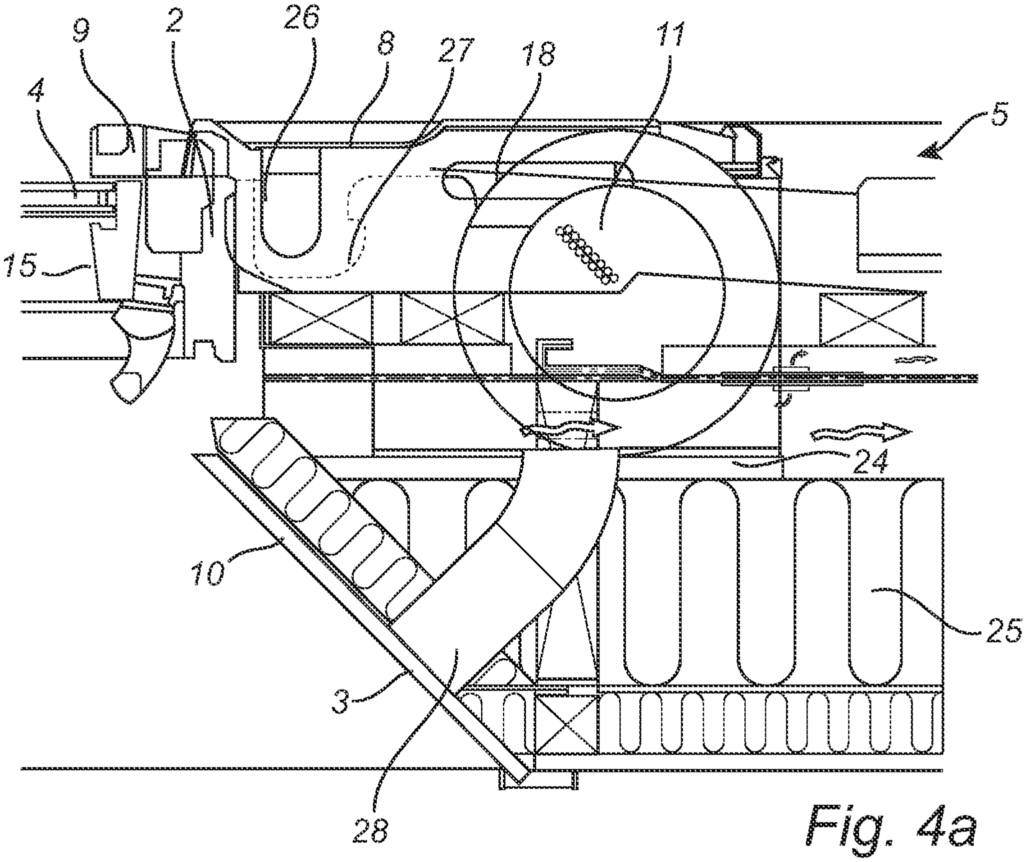
FIG. 4*a* is a cross-sectional view of a roof window system including the ventilation panel in an alternative embodiment.
Figure 4B:
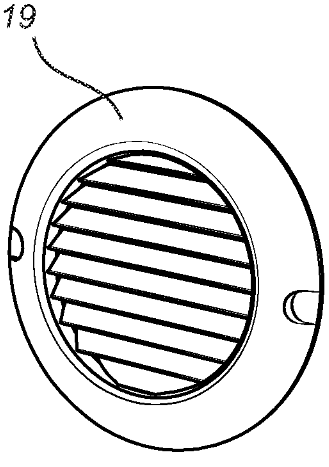
FIGS. 4*b* and 4*c* are perspective view of details of the alternative embodiment of FIG. 4*a,*
Figure 4C:
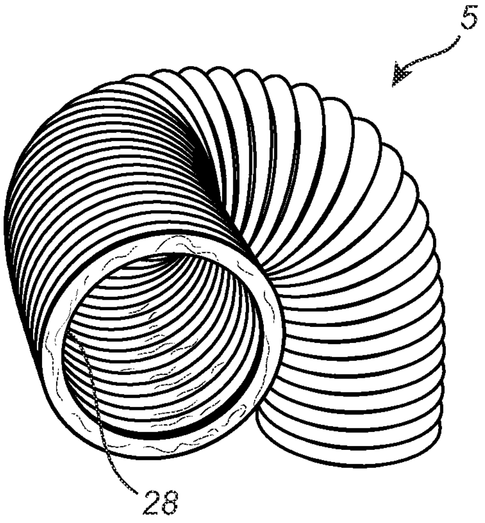

FIG. 4*a* shows an alternative embodiment in which only details relative to the embodiment of FIG. 3*a* will be described in detail. Here, the ventilation panel 3 is integrated into the lining panel 10 at a distance from the pane 4. FIGS. 4*b* and 4*c* show details of the embodiment, namely an air grating 19 for the ventilation passage facing towards the interior of the building 14. The air grating 19 provides a closure for the ventilation panel 3. The air grating 19 may be temporary locked between a closed and an open position. Furthermore, an example of a flexible tubing serving as the ventilation passage 28 is shown.

In this way, the housing 6 of the ventilation unit 5 is prepared for accommodation of a standard ventilator and/or a regenerator allowing an air current through the ventilation passage 28 created by a ventilation panel 3 in that the ventilation panel 3 extends from one side of the ventilator to the lining panel 10, such that it connects the space defined by the housing with the space at the internal side of the window defined by the interior of the building. Thus, an air current is allowed to pass through the ventilation passage 28, from the exterior grating 18 to the interior of the room, here in the form of a ventilation panel 3 integrated into or in continuation of a lining panel of a room in the interior of the building in which the roof window is installed.

Figure 5:
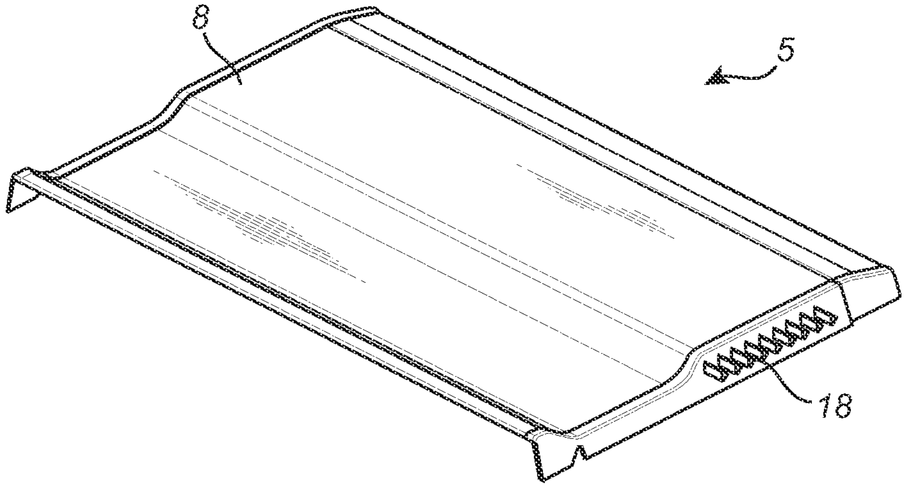
FIG. 5 is a perspective view of the top case of the housing in an embodiment.

FIG. 5 shows an embodiment of the top case 8 of the housing showing the exterior air grating 18. When the roof window system is mounted, the exterior air grating 18 is placed such that it is higher than the plane of the roof window, so that rainwater does not enter into the exterior air grating 18.

The person skilled in the art realizes that the present invention by no means is limited to the preferred embodiments described above. On the contrary, many modifications and variations are possible within the scope of the appended claims.

LIST OF REFERENCE NUMERALS

1 roof window system
2 frame
3 ventilation panel
4 pane
5 ventilation unit
6 housing
8 top case of housing
9 top frame covering
10 lining panel
11 ventilator
12 groove
13 roof window
14 interior of building
15 sash
16 frame opening
18 exterior air grating
19 air grating
20 intended air flow direction
21 exterior direction
22 interior direction
23 roof structure
24 lower side of ventilation unit
25 insulation
26 longitudinal channel
27 drainage channel
28 ventilation passage

The invention claimed is:

1. A method of retrofitting a roof window system configured for being mounted in an opening in a roof structure of a building, said roof window system including a ventilation unit configured for being mounted adjacent to a roof window and adapted for providing ventilation of an interior of the building in which the roof window is mounted, where said roof window comprises at least one frame defining a frame plane and including a pane mounted in said at least one frame, the at least one frame comprising a top frame member intended for being located highest in a mounted state when seen in a direction of inclination of the roof structure, a bottom frame member opposite the top frame member, and two side frame members extending between the top frame member and the bottom frame member, said top frame member, said bottom frame member and said two side frame members together form a window structure delimiting a frame opening and each having an interior side intended for facing an interior in the mounted state, an exterior side intended for facing an exterior, an inner side facing the frame opening and an outer side facing away from the frame opening, where the ventilation unit is configured for being arranged adjacent to the outer side of a corresponding frame member, and said ventilation unit comprises a housing with a top side facing the exterior of the building and said housing being configured to accommodate a ventilator, said housing comprising a lower side configured for being arranged adjacent to or at the exterior side of said corresponding frame member, said housing constitutes a separate module mounted adjacent to the roof window, the top side is positioned substantially in the plane of the frame plane, such that the top side does not protrude towards an exterior of the building, and the housing comprises a longitudinal channel, said longitudinal channel is mounted onto the at least one frame of the roof window, in parallel to a longitudinal edge of the top frame member, and the housing comprises a drainage channel extending from the longitudinal channel to the ventilator, such that the drainage channel forms a positive angle with a bottom side of the longitudinal channel, defined in an opposite direction of the top side, said method comprising the steps of:

removing the housing, selecting an element of the ventilation unit, installing and/or replacing the element of the ventilation unit, mounting the housing back to the ventilation unit.

2. The method of claim 1 wherein the corresponding frame member is said top frame member.

3. The method of claim 1 wherein said roof window system further comprises a lining panel and a ventilation panel, said ventilation panel extends from one side of the ventilator to the lining panel, such that said ventilation panel connects a space defined by the housing with a space at an internal side of the roof window defined by the interior of the building.

4. A method of retrofitting a roof window system configured for being mounted in an opening in a roof structure of a building, said roof window system including a ventilation unit configured for being mounted adjacent to a roof window and adapted for providing ventilation of an interior of the building in which the roof window is mounted, where said roof window comprises at least one frame defining a frame plane and including a pane mounted in said at least one frame, the at least one frame comprising a top frame member intended for being located highest in a mounted state when seen in a direction of inclination of the roof structure, a bottom frame member opposite the top frame member, and two side frame members extending between the top frame member and the bottom frame member, said top frame member, said bottom frame member and said two side frame members together form a window structure delimiting a frame opening and each having an interior side intended for facing an interior in the mounted state, an exterior side intended for facing an exterior, an inner side facing the frame opening and an outer side facing away from the frame opening, where the ventilation unit is configured for being arranged adjacent to the outer side of a corresponding frame member, and said ventilation unit comprises a housing, said housing is adapted for accommodating a ventilator providing ventilation to an interior of the building in which the roof window is mounted, said housing is configured to face an exterior of the building and extend away from the exterior side of the corresponding frame member adjacent to which the housing is mounted, and in that said housing constitutes a separate module mounted adjacent to the roof window, said roof window system further including a lining panel, and wherein said housing is configured to allow an air current through a ventilation passage created by a ventilation panel, said ventilation panel extending from one side of the ventilator to the lining panel, such that said ventilation panel connects a space defined by the housing with a space at an internal side of the roof window defined by the interior of the building, said method comprising the steps of:

removing the housing, selecting an element of the ventilation unit, installing and/or replacing the element of the ventilation unit, mounting the housing back on the roof structure.

5. A method of retrofitting a roof window system configured for being mounted in an opening in a roof structure of a building, said roof window system including a ventilation unit configured for being mounted adjacent to a roof window and adapted for providing ventilation of an interior of the building in which the roof window is mounted, where said roof window comprises at least one frame defining a frame plane and including a pane mounted in said at least one frame, the at least one frame comprising a top frame member intended for being located highest in a mounted state when seen in a direction of inclination of the roof structure, a bottom frame member opposite the top frame member, and two side frame members extending between the top frame member and the bottom frame member, said top frame member, said bottom frame member and said two side frame members together form a window structure delimiting a frame opening and each having an interior side intended for facing an interior in the mounted state, an exterior side intended for facing an exterior, an inner side facing the frame opening and an outer side facing away from the frame opening, where the ventilation unit is configured for being arranged adjacent to the outer side of a corresponding frame member, and said ventilation unit comprises a housing with a top side facing the exterior of the building and said housing being configured to accommodate a ventilator, said housing comprising a lower side configured for being arranged adjacent to or at the exterior side of said corresponding frame member, said housing constitutes a separate module mounted adjacent to the roof window, and the housing comprises a longitudinal channel, said longitudinal channel is mounted onto the at least one frame of the roof window, in parallel to a longitudinal edge of the top frame member, and the housing comprises a drainage channel extending from the longitudinal channel to the ventilator, such that the drainage channel forms a positive angle with a bottom side of the longitudinal channel, defined in an opposite direction of the top side, said method comprising the steps of:

removing the housing, selecting an element of the ventilation unit, installing and/or replacing the element of the ventilation unit, mounting the housing back on the roof structure.

* * * * *